(12) United States Patent
Wang et al.

(10) Patent No.: US 9,371,766 B2
(45) Date of Patent: Jun. 21, 2016

(54) ENGINE-ON TIME PREDICTOR FOR AFTERTREATMENT SCHEDULING FOR A VEHICLE

(75) Inventors: Qing Wang, Canton, MI (US); Hai Yu, Canton, MI (US); Ryan Abraham McGee, Ann Arbor, MI (US); Fling Tseng, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 951 days.

(21) Appl. No.: 13/616,250

(22) Filed: Sep. 14, 2012

(65) Prior Publication Data

US 2014/0081563 A1  Mar. 20, 2014

(51) Int. Cl.
*F01N 3/023* (2006.01)
*F01N 9/00* (2006.01)
(Continued)

(52) U.S. Cl.
CPC .............. *F01N 9/007* (2013.01); *B60W 20/11* (2016.01); *B60W 20/12* (2016.01); *B60W 20/16* (2016.01); *B60W 50/0097* (2013.01); *F01N 9/00* (2013.01); *F02D 41/021* (2013.01); *F02D 41/029* (2013.01); *F02N 11/0829* (2013.01); *B60W 2550/143* (2013.01); *B60W 2550/402* (2013.01); *B60Y 2300/476* (2013.01);
(Continued)

(58) Field of Classification Search
CPC . F02D 41/027; F02D 41/029; F02D 41/0235; F02N 9/002; F02N 3/035; B60W 20/11; B60W 20/12; B60W 20/16; F01N 3/023
USPC .................... 60/284–287, 294–295
See application file for complete search history.

(56) References Cited

U.S. PATENT DOCUMENTS

| 4,393,696 A | * | 7/1983 | Willis | ................. F02P 5/04 123/406.65 |
| 4,438,497 A | * | 3/1984 | Willis | ................. F02P 5/1455 123/406.65 |

(Continued)

FOREIGN PATENT DOCUMENTS

GB   2479196 A   10/2011

OTHER PUBLICATIONS

Park et al., "Intelligent Vehicle Power Control Based on Machine Learning of Optimal Control Parameters and Prediction of Road Type and Traffic Congestion", IEEE Transactions on Vehicular Technology, vol. 58, No. 9, Nov. 2009, pp. 4741-4756.

*Primary Examiner* — Thomas Moulis
(74) *Attorney, Agent, or Firm* — Brooks Kushman P.C.; David B. Kelley

(57) ABSTRACT

A method to control a hybrid electric vehicle (HEV) having a compression ignition engine includes operating the engine based on an engine-on request and performing an exhaust aftertreatment procedure based on a completion time for the aftertreatment procedure compared to a predicted engine-on time determined using a driving pattern. An HEV is provided with a compression ignition engine with an aftertreatment system, and a controller. The controller is configured to: (i) operate the engine based on an engine-on request, and (ii) perform an exhaust aftertreatment procedure for the vehicle based on a completion time for the aftertreatment procedure compared to a predicted engine-on time determined using a driving pattern. A computer readable medium having stored data representing instructions executable by a controller to control a vehicle is provided with instructions for operating the engine based on an engine-on request, and instructions for performing an exhaust aftertreatment procedure.

20 Claims, 5 Drawing Sheets

(51) Int. Cl.
  *F02D 41/02* (2006.01)
  *F02N 11/08* (2006.01)
  *B60W 50/00* (2006.01)
  *F02D 41/14* (2006.01)

(52) U.S. Cl.
  CPC ...... *B60Y 2400/432* (2013.01); *F01N 2590/11* (2013.01); *F01N 2900/0402* (2013.01); *F01N 2900/08* (2013.01); *F02D 2041/1412* (2013.01); *F02D 2200/702* (2013.01); *Y02T 10/47* (2013.01); *Y02T 10/48* (2013.01); *Y02T 10/84* (2013.01)

(56) References Cited

U.S. PATENT DOCUMENTS

| | | | |
|---|---|---|---|
| 5,397,550 A * | 3/1995 | Marino, Jr. | F01N 3/023 422/168 |
| 6,032,461 A * | 3/2000 | Kinugasa | F01N 3/023 60/285 |
| 6,314,347 B1 * | 11/2001 | Kuroda | B60K 6/543 701/22 |
| 6,331,762 B1 * | 12/2001 | Bertness | G01R 31/3627 320/134 |
| 7,261,086 B2 | 8/2007 | Nuang | |
| 7,980,062 B2 | 7/2011 | Barton et al. | |
| 8,015,805 B2 | 9/2011 | Pfaeffle et al. | |
| 8,452,474 B2 | 5/2013 | Ogiso | |
| 8,572,951 B2 * | 11/2013 | Gallagher | B60C 5/04 123/676 |
| 8,789,361 B2 | 7/2014 | Arntson et al. | |
| 2003/0135323 A1 | 7/2003 | Votsmeier et al. | |
| 2004/0144087 A1 | 7/2004 | Kondou et al. | |
| 2005/0166580 A1 * | 8/2005 | Pfaeffle | F01N 3/023 60/295 |
| 2007/0069734 A1 * | 3/2007 | Bertness | G01R 31/007 324/411 |
| 2007/0125074 A1 | 6/2007 | Marquardt | |
| 2007/0271906 A1 * | 11/2007 | Berke | F01N 3/106 60/285 |
| 2008/0282674 A1 * | 11/2008 | Gonze | B60K 6/48 60/285 |
| 2009/0044530 A1 * | 2/2009 | Gallagher | F01N 3/023 60/605.1 |
| 2009/0301061 A1 * | 12/2009 | Sahlen | B60W 10/06 60/285 |
| 2009/0312889 A1 * | 12/2009 | Krupadanam | B60W 20/11 701/1 |
| 2010/0043404 A1 * | 2/2010 | Hebbale | F01N 9/00 60/286 |
| 2010/0063659 A1 | 3/2010 | Ogiso | |
| 2010/0326058 A1 * | 12/2010 | Shibamori | F01N 3/023 60/295 |
| 2011/0225949 A1 * | 9/2011 | Tewari | F01N 3/023 60/274 |
| 2011/0257821 A1 | 10/2011 | Beaucaire et al. | |
| 2011/0283682 A1 * | 11/2011 | Gallagher | F02D 41/029 60/274 |
| 2012/0167555 A1 * | 7/2012 | Frazier | B60W 10/06 60/274 |
| 2014/0074386 A1 * | 3/2014 | McGee | B60W 50/0097 701/113 |

* cited by examiner

ENGINE-ON TIME PREDICTOR FOR AFTERTREATMENT SCHEDULING FOR A VEHICLE

TECHNICAL FIELD

Various embodiments relate to a vehicle, such as a hybrid vehicle having a compression ignition engine, and a method to control an exhaust aftertreatment for the vehicle.

BACKGROUND

The engine operation in a hybrid electric vehicle (HEV) is significantly different than in a conventional vehicle as the vehicle may be operated using electric power only. In certain hybrids, such as plug-in electric hybrids (PHEVs), battery energy may be prioritized, and the engine may only run for a short time period during a vehicle operation cycle, or from key on to key off.

An HEV or PHEV with a diesel engine require emission control devices and corresponding control strategies for the devices. The diesel aftertreatment procedures or requirements may force more frequent and continuous engine-on operation. Examples of aftertreatment procedures include: diesel particulate filter (DPF) regeneration, catalyst light off, diesel oxidation catalyst (DOC) heat-up, other exhaust temperature maintenance procedures, and maintaining in-use monitor performance ratios (IUMPRs).

Energy management in a diesel PHEV favors reduced or minimum engine-on time to gain fuel economy benefits. There may be additional drivability concerns or expectations, like PHEV users, expecting the engine to be off when the power demand is low and the vehicle speed is low. The aftertreatment procedures need to be completed without significantly impacting fuel economy or drivability.

Various embodiments of the present disclosure provide opportunistic scheduling of some aftertreatment procedures such that they occur during an engine-on window for the vehicle thereby minimally impacting fuel economy and drivability expectations. An engine-on condition may be triggered by events such as a driving power request or battery state of charge (SOC) condition.

SUMMARY

In an embodiment, a method is provided to control a hybrid electric vehicle with a compression ignition engine. A compression ignition engine is operated based on an engine-on request. An exhaust aftertreatment procedure is performed based on a completion time for the aftertreatment procedure compared to a predicted engine-on time determined using a driving pattern.

In another embodiment, a vehicle is provided with a compression ignition engine having an exhaust aftertreatment system, and a controller electronically coupled to the engine. The controller is configured to: (i) operate the engine based on an engine-on request, and (ii) perform an exhaust aftertreatment procedure for the vehicle based on a completion time for the aftertreatment procedure compared to a predicted engine-on time determined using a driving pattern.

In yet another embodiment, a computer readable medium having stored data representing instructions executable by a controller to control a vehicle is provided with instructions for operating the engine based on an engine-on request, and instructions for performing an exhaust aftertreatment procedure for the vehicle based on a completion time for the aftertreatment procedure compared to a predicted engine-on time determined using a driving pattern.

Various embodiments according to the present disclosure have associated advantages. For example, the algorithms disclosed use predictive information to intelligently optimize the aftertreatment occurrences in a diesel hybrid vehicle, and may significantly improve both fuel economy and emissions of the vehicle. The method establishes an engine-on time percentage for various driving patterns by using real-world driving conditions and driver styles from historical and predicted driving data to result in an engine-on time estimation. Use of models or simulations may reduce time and costs associated with live vehicle testing to the extent possible. Also use of simulation and testing to create tables offboard leads to reduced real-time computations by the vehicle controller when the vehicle is operated.

DETAILED DESCRIPTION

Figure 1:
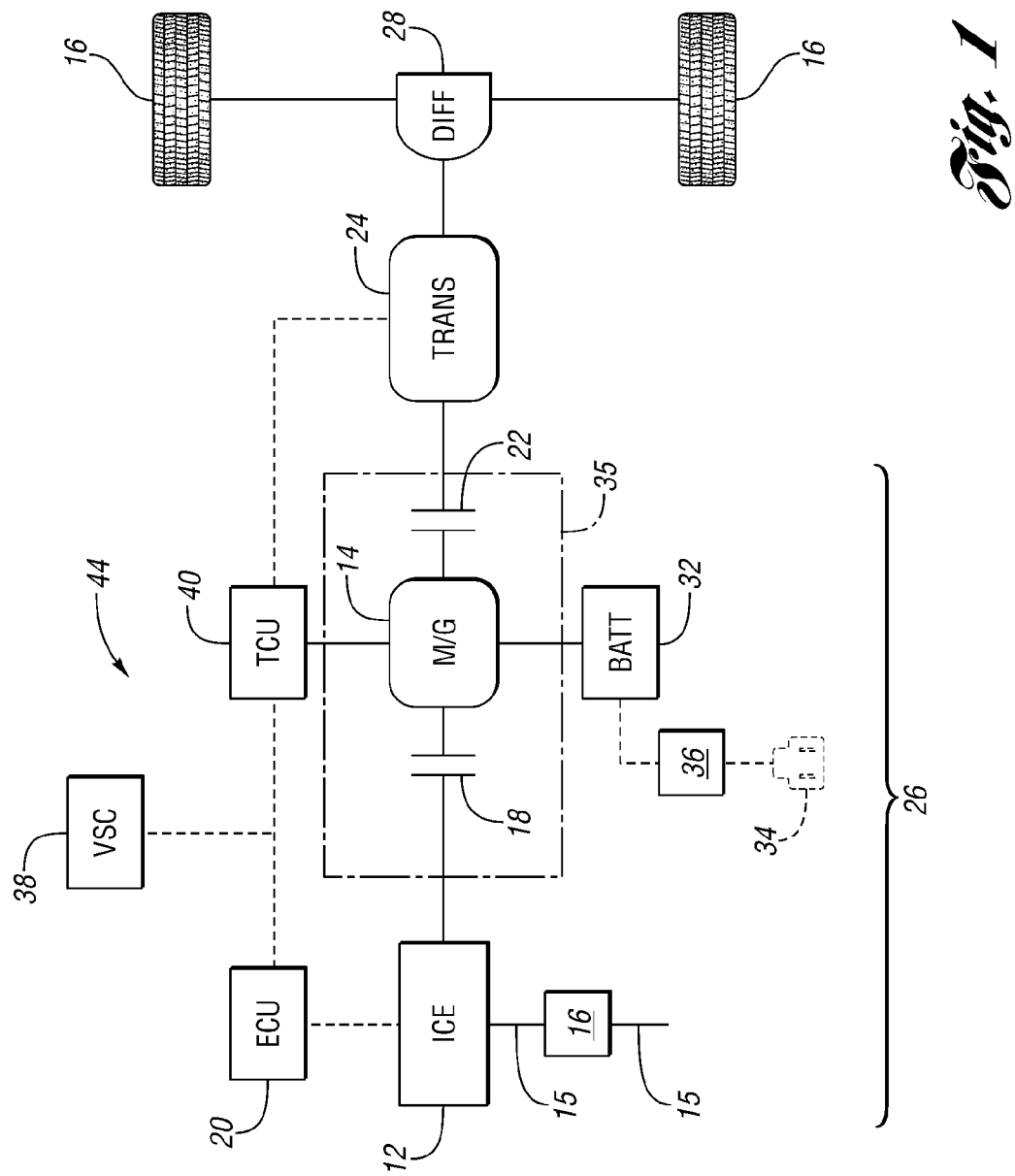
FIG. 1 is a schematic representation of a hybrid electric vehicle having aftertreatment control according to an embodiment.

As required, detailed embodiments of the present disclosure are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Providing aftertreatment procedures for a diesel hybrid vehicle may be difficult because of the uncertainty in engine-on time and engine operation. Engine operation is connected to future vehicle operation which includes driving uncertainties and/or unanticipated environmental conditions. Having an engine-on time (EOT) or engine-on percent (EOT %) for a vehicle cycle allows scheduling and conducting an opportunistic aftertreatment procedure while maintaining fuel efficiency and drivability. In order to calculate a theoretical EOT % and EOT for the vehicle, the future vehicle cycles (speed profile and road conditions) are predicted because the EOT % is dependent on the vehicle operating conditions which correspond to driving cycles. Although the accurate speed profile and road conditions of the scheduled vehicle journeys would provide this information, it may be unfeasible to obtain them. The EOT % may be estimated using a pattern prediction method to provide an EOT for the diesel hybrid vehicle and to opportunistically schedule aftertreatment procedures.

A hybrid electric vehicle (HEV) structure is used in the figures and to describe the various embodiments below; however, it is contemplated that the various embodiments may be used with vehicles having other propulsion devices or combinations of propulsion devices as is known in the art. HEVs typically have power supplied by a battery powered electric motor, an engine, or a combination thereof. Some HEVs have a plug-in feature which allows the battery to be connected to an external power source for recharging, and are called plug-in HEVs (PHEVs). Electric-vehicle mode (EV mode) in HEVs and PHEVs allows the vehicle to operate using the electric motor alone, while not using the engine, which may enhance the ride comfort, the fuel economy, and the environment through zero emissions from the vehicle during this period of operation.

The opportunistic aftertreatment procedures as described herein may also be used with a conventional diesel engine vehicle to prevent initiation of an aftertreatment procedure on a trip having a short duration where the procedure cannot be completed during the trip. By running opportunistic aftertreatment procedures during trips having sufficient time to complete an aftertreatment procedure, the procedure success rate and fuel economy may be increased.

In one example, the vehicle is a hybrid vehicle (HEV) having a compression ignition engine, such as a diesel engine, and additionally may have the ability to connect to an external electric grid, such as in a plug-in electric hybrid vehicle (PHEV). A PHEV uses a larger capacity battery pack than a standard hybrid vehicle, and it adds a capability to recharge the battery from an electric power grid, which supplies energy to an electrical outlet at a charging station, which provides an additional electric energy stored in the battery from the grid after each battery charge event. This further improves the overall vehicle system operating efficiency in an electric driving mode and in a hydrocarbon/electric blended driving mode.

While most conventional HEVs are operated to maintain the battery state of charge (SOC) around a constant level, PHEVs use as much pre-saved battery electric (grid) energy as possible before the next battery charge event. The relatively low cost grid supplied electric energy is expected to be fully utilized for propulsion and other vehicle functions after each charge. After the battery SOC decreases to a low conservative level during a charge depleting event, the PHEV resumes operation as a conventional HEV in a so-called charge sustaining mode until the battery is re-charged.

FIG. 1 illustrates an HEV 10 powertrain configuration and control system. The HEV configuration as shown is for example purposes only and is not intended to be limiting as the present disclosure applies to vehicles of any suitable architecture, including HEVs and PHEVs.

FIG. 1 illustrates a schematic diagram of a hybrid vehicle 10 according to an embodiment. The vehicle 10 includes an internal combustion engine (ICE) 12, and an electric machine, which, in the embodiment shown in FIG. 1, is a motor generator (M/G) 14, which functions as a traction motor. The M/G 14 is configured to transfer torque to the engine 12 or to the vehicle wheels 16. The engine 12 may be a compression ignition engine, and may use various fuel sources, such as diesel, biofuel, or the like. The engine 12 has an exhaust 15, which flows through an aftertreatment system 16, such as a DPF, DOC, and/or the like, and to the environment.

In one embodiment, the aftertreatment system 16 is a diesel particulate filter (DPF) filters particulate matter, such as soot and the like, from the exhaust stream of the engine 12. Over time the particulate filter 16 accumulates matter, which may reduce flow through the filter 16. Higher exhaust temperatures may be used to clean the particles from the filter 16. Extra fuel is injected into the engine 12 and the higher exhaust temperature burns off particulates, such as soot, from the filter 16. This process is termed DPF Regeneration (DPF Regen). A control strategy for the aftertreatment system 16 determines when the regeneration process is required and then modifies the fuel control strategy to increase the exhaust temperature. For example, in a conventional vehicle this process may occur roughly every 300 miles and it may take twenty minutes to complete. If a DPF Regen process is interrupted prior to completion (e.g. due to a key off event), the control system will conduct another DPF Regen at a later time. Since the DPF Regen utilizes additional fuel, it may be less desirable to start the regeneration process if a drive cycle will not allow completion. Fuel economy may be degraded during drive cycles in which a DPF Regen takes place. Overall fuel economy may be further degraded if the process is attempted and interrupted such that it is not completed during a first attempt.

The M/G 14 is connected to the engine 12 using a first clutch 18, also known as a disconnect clutch or upstream clutch. A second clutch 22, also known as a launch clutch or downstream clutch, connects the M/G 14 to a transmission 24, and all of the input torque to the transmission 24 flows through the launch clutch 22. The launch clutch 22 can be controlled to isolate the driveline 26, which includes the M/G 14 and the engine 12, from the transmission 24, differential 28, and the vehicle drive wheels 16. Although the clutches 18, 22 are described and illustrated as hydraulic clutches, other types of clutches, such as electromechanical clutches may also be used. In one embodiment, the clutch 22 is implemented by a torque converter and bypass clutch.

In some embodiments, the vehicle 10 also includes a starter motor (not shown) operatively connected to the engine 12, for example, through a belt or gear drive. The starter motor may be used to provide torque to start the engine 12 without the addition of torque from the M/G 14.

The M/G 14 is in communication with a battery 32. The battery 32 may be a high voltage battery. The M/G 14 may be configured to charge the battery 32 in a regeneration mode, for example when a driver demands negative wheel torque, through regenerative braking, or the like. In one example the battery 32 is configured to connect to an external electric power grid, such as for a plug-in hybrid electric vehicle (PHEV) with the capability to recharge the battery from the electric power grid, which supplies energy to an electrical outlet at a charging station. The battery 32 is additionally rechargeable in a PHEV vehicle 10 configuration (shown in phantom), using a receptacle 34 which is connected to the power grid or other outside electrical power source and is coupled to battery 26, possibly through a battery charger/converter 36.

In an embodiment, a PHEV 10 prioritizes battery 32 energy such that the engine 12 may not run for an entire drive cycle. Alternatively, the engine 12 may only operate for a short time period. The manner in which the engine 12 is operated is driven by the vehicle 10 usage pattern and various powertrain constraints ranging from full vehicle powertrain capability in an electric-only vehicle (EV) to a blended vehicle powertrain capability where engine 12 operation may be required when the vehicle 10 is travelling above a certain speed or if the power demanded by the driver exceeds battery 32 limits. A PHEV may have two primary modes of operation: charge depleting and charge sustaining In a charge depleting mode, the use of battery 32 energy is prioritized to discharge the battery. Once a target depth of discharge is reached, the PHEV operates in a charge sustaining mode. In the charge sustaining mode, the PHEV maintains the battery 32 SOC around a fixed level.

A vehicle system controller (VSC) 38 transfers data between a transmission control unit (TCU) 40 and an engine control unit (ECU) 42 and is also in communication with various vehicle sensors. The control system 44 for the vehicle 10 may include any number of controllers, and may be integrated into a single controller, or have various modules. Some or all of the controllers may be connected by a controller area network (CAN) or other system. The control system 44 may be configured to control operation of the various components of the transmission 24, the motor generator assembly 35, and the engine 12 under any of a number of different conditions.

The crankshaft or output shaft of engine 12 is connected to the disconnect clutch 18, which in turn is connected to the input shaft for the M/G 14. The M/G 14 output shaft is connected to the launch clutch 22, which in turn is connected to the transmission 24. The components of driveline 26 of the vehicle 10 are positioned sequentially in series with one another.

A method or algorithm for use by the vehicle 10 includes opportunistic aftertreatment scheduling using pattern prediction to improve both energy management and emissions in a diesel PHEV. A pattern-based EOT predictor enables opportunistic aftertreatment scheduling for diesel PHEVs using pattern prediction, and off-board simulations and/or vehicle testing.

An algorithm for use with the vehicle 10 uses pattern prediction from a driving pattern identification method and off-board simulations (or vehicle tests) to provide an EOT % estimation for the vehicle. The set of the driving patterns can be defined and differentiated by traffic speed, road condition, traffic congestion levels, and roadway types, as well as individual driving styles.

The algorithm determines time windows during driving routes of the vehicle 10 that permit completion of one or more designated aftertreatment procedures with low impact on fuel economy and vehicle drivability. The algorithm schedules the designated aftertreatment procedure at an appropriate time during the driving route. The determination of a 'qualified window' for the aftertreatment procedure during various drive cycles may depend on a predicted EOT % during a segment of the route or the cycle. The predicted EOT may be determined using historical usage patterns and/or future predicted information such as a route entered into the navigation system, real-time traffic, vehicle to vehicle (V2V) or vehicle to information (V2I) systems, etc.

Estimating a future speed profile and road conditions may be difficult and inefficient in terms of cost or time. However, a PHEV EOT % may be fairly consistent and stable within each driving pattern for the vehicle 10 even with some speed and grade differences.

The driving pattern identification method detects and recognizes various driving conditions as one of a set of standard drive patterns, including for example, city, highway, urban, traffic, low emissions, etc. In one embodiment, the algorithm is based on machine learning using a neural network. In other embodiments, the algorithm is based on support vector machines, fuzzy logic, or the like.

The algorithm chooses sequences of "drive patterns" as the most effective high-level representation of the traffic speed, road condition and driving style as the basis to calculate the average EOT %. That can avoid the high cost and uncertainties of acquiring the precise future speed profiles and road conditions, but retain enough accuracy in estimating the PHEV's EOT. The algorithm may place several different drive patterns in sequence to represent various segments of a predicted route for the vehicle. Additionally, each drive pattern may have an associated time for the vehicle 10 to be operating under the conditions represented by the drive pattern.

The algorithm may be developed using a driving pattern and driving style identification technique to automatically detect and recognize one of the predefined driving patterns from the driving conditions or driving aggressiveness. Regarding the driving pattern identification method, the EOT, and the EOT % for a particular pattern are connected to individual driving styles, roadway types, and traffic congestion levels. A set of standard drive patterns, called facility-specific cycles, have been developed to represent passenger car and light truck operations over a broad range of facilities and congestion levels in urban areas. (See, for instance, Sierra Research, Development of Speed Correction Cycles, Sierra Report No. SR97-04-01 (1997).) Driving styles have been captured in these standard drive patterns as well. For example, for the same roadway type and traffic level, different drivers may lead to different drive patterns. An online driving pattern identification method that automatically detects real-world driving condition and driving style and recognizes it as one of the standard patterns has been developed. (See, for example, Jungme Park, ZhiHang Chen, Leonidas Kiliaris, Ming Kuang, Abul Masrur, Anthony Phillips, Yi L. Murphey, 'Intelligent Vehicle Power Control based on Machine Learning of Optimal Control Parameters and Prediction of Road Type and Traffic Congestions', IEEE Transactions on Vehicular Technology, November 2009, Volume 58, Issue 9.) This online driving pattern method is based on machine learning using a neural network and its accuracy has been proven by simulations.

The path, trip, or route may be entered or indicated by a user, or may be provided using an electronic horizon, which computes a route probability based on roads near the vehicle, the direction or the vehicle, etc. For example, if a vehicle is on a highway, the electronic horizon will use a highway path and the distance to the next exit as future predicted information, and then switch to an unknown, unpredicted future. For example, for a vehicle operating on a highway, there may be a relatively high value for the EOT %, meaning that the engine may be operating for a relatively large fraction of the time that the vehicle is within this driving pattern. The EOT may be associated with a single engine pull up within a pattern, or may be associated with multiple engine pull ups within the pattern. The total time that the engine is on within the pattern compared to the length of the pattern provides the EOT %.

The algorithm may also be based on vehicle simulation models that represent the actual vehicle with built-in controllers. For example, the simulation may accurately compute the PHEV EOT % under any driving pattern represented by typical driving cycles. These simulation results may be compared with the vehicle test results for accuracy.

Figure 2:
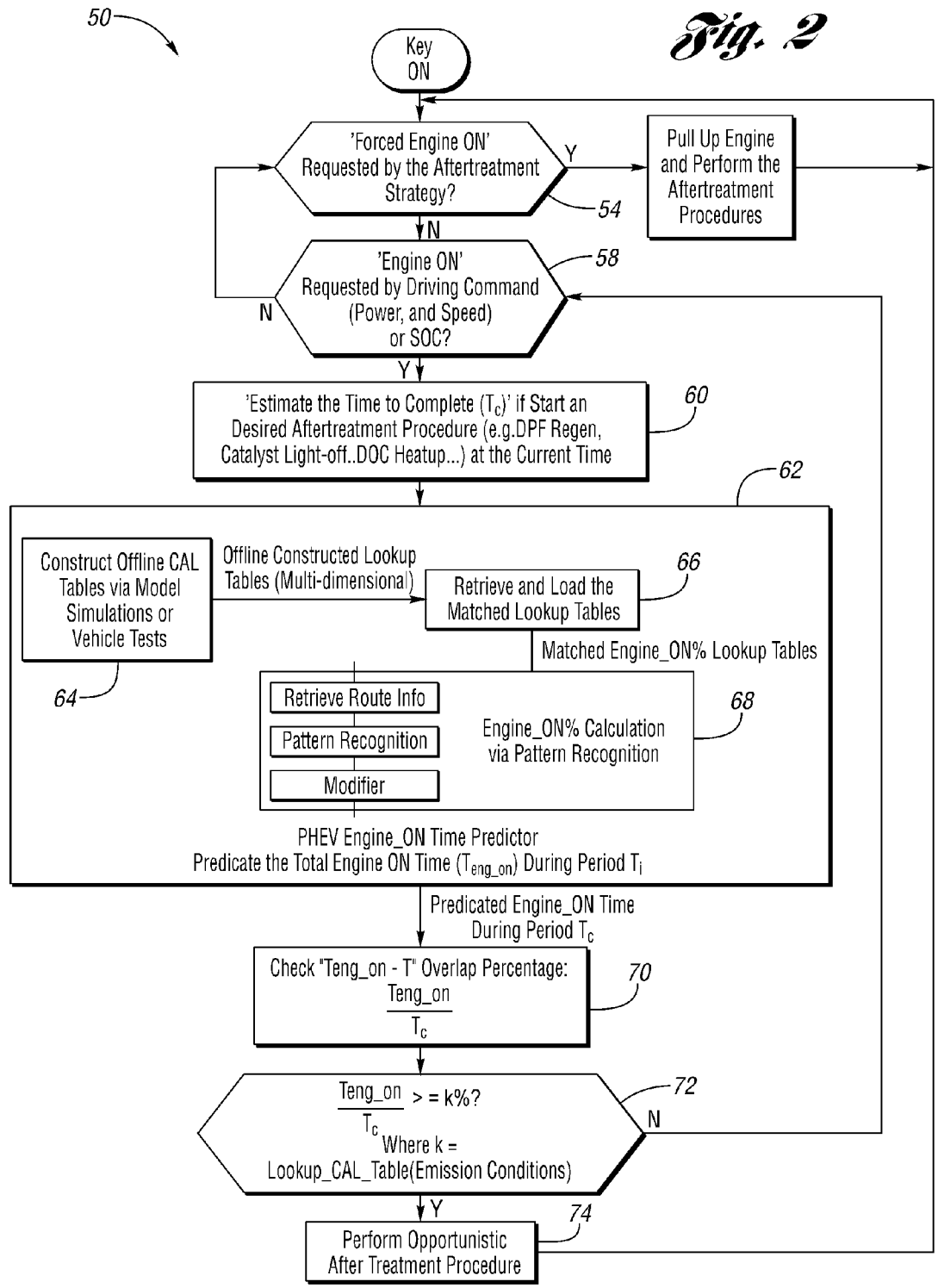
FIG. 2 is a flow chart of an algorithm for controlling aftertreatment for use with the vehicle of FIG. 1.

FIG. 2 illustrates an embodiment of the algorithm 50 for use with a control system for a hybrid vehicle having a diesel engine, such as the control system 44 for vehicle 10 in FIG. 1. The algorithm 50 starts at 52, such as after a vehicle key on event. At 54, the control system 44 determines if there is a forced aftertreatment procedure condition requiring a forced engine pull up (FEPU) in order to conduct the aftertreatment procedure. If there is an immediate need or prompt to conduct an aftertreatment procedure which requires the engine 12 on at 54, the engine 12 is pulled up and the aftertreatment is performed at 56. Due to the opportunistic aftertreatment strategy as described below, the occurrence of a forced aftertreatment procedure may be reduced.

If no immediate or forced aftertreatment-based engine-on state is required at 54, the algorithm proceeds to 58, and monitors for any engine-on (or engine pull up) requests that are triggered by the vehicle state, such as a driving command (i.e. total power demand and speed request) SOC condition, temperature, overvoltage protection, climate request, or the like. When such an engine-on request occurs, the algorithm proceeds to 60 and estimates the time to complete one or more designated aftertreatment procedures ($T_c$) assuming it begins at the current time.

The $T_c$ for a given aftertreatment procedure may be a function of the aftertreatment conditions. For example, the $T_c$ for a DPF regeneration may be calculated from a system restriction metric sent by the ECU 42 and correlated with a measured backpressure difference across the DPF. Similarly the $T_c$ for a DOC heat-up may be estimated from a measured temperature and an average engine power. Depending on the condition of the aftertreatment device 16 or which device 16 is being used, the $T_c$ may vary accordingly.

In one embodiment, with a DPF filter as the aftertreatment system 16, the aftertreatment condition may be monitored using a system restriction metric, which is a signal computed by the ECU 42 and correlated with a measured backpressure difference across the DPF. The metric is essentially a normalized pressure drop and is an indicating signal for DPF conditions. The metric reflects the cumulative effects of increasing particulate loading in the filter over time. When the metric reaches or exceeds a predetermined value, a regeneration cycle is requested. Depending on engine 12 operating conditions, this request is eventually granted. The default 'forced DPF Regen' is incorporated in our strategy and is briefly described in the next section.

After determining the $T_c$ at 60, the algorithm proceeds to determine the EOT at 62, by processing historical usage patterns and predicted information such as a route entered into the navigation system, real-time traffic, V2V/V2I information, etc. Step 62 includes three sub-steps 64, 66, 68. In sub-step 64, calibration tables or lookup tables are constructed via model simulations or vehicle testing, for example, in an off-line situation. The tables are provided to sub-step 66. In sub-step 66, the tables that correspond to the specific vehicle, driving style, and environmental condition are retrieved and loaded, and matched EOT % tables are provided. In sub-step 68, the algorithm uses the EOT % tables from 66 to calculate the EOT % for each driving pattern using pattern recognition techniques. The vehicle operates for a time ($T_i$) for a given driving pattern during the time to complete the aftertreatment procedure. The control system 44 reads the predicted route information, recognizes the driving cycle from one of the pre-defined driving patterns, and uses a modifier function to further adjusts the results. Additional details of steps 64, 66, 68 are discussed below. The algorithm uses the EOT % and $T_i$ to calculate and predict the EOT during a driving pattern time period T. Note that the engine 12 may be on one, or more times during a given $T_i$ and a given $T_c$, and that the EOT represents the total engine-on time during time period $T_c$.

Step 70 uses the EOT and $T_c$ to calculate an overlap percentage between EOT and $T_c$. For example, if an aftertreatment procedure such as heating up the DOC to a designated temperature takes five minutes, and the engine will remain on for three minutes, the overlap percentage is $EOT/T_c = 60\%$.

Step 72 uses the overlap percentage and conducts an arbitration step to determine if the overlap is sufficiently long for an opportunistic aftertreatment procedure. Step 72 compares the overlap percentage with a threshold k value. The k value is determined using a calibration table based on emission conditions, i.e. the DPF value, the catalyst or DOC temperature, etc. As the need for an aftertreatment procedure increases, the k value decreases. The k value is calibrated based on a variety of test conditions to balance a tradeoff between fuel economy and emissions requirements.

If the overlap percentage is less than the k value, the algorithm determines at step 72 that the aftertreatment will wait, and returns to step 58. If the overlap percentage is equal to or greater than the k value, an opportunistic aftertreatment procedure may occur, and proceeds to step 74. At 74, the aftertreatment procedure is performed, and the algorithm then returns to 54.

Once the opportunistic aftertreatment procedure is in progress, the algorithm 50 may set an 'Inhibit Engine-Off' signal until the aftertreatment procedure is completed, such that the engine cannot be pulled down in the middle of an aftertreatment procedure. Maintaining an engine-on state in the vehicle until the opportunistic aftertreatment procedure is completed prevents interrupted aftertreatment procedures, and increases overall fuel economy. The 'Inhibit Engine-Off' signal may have an override, such as a vehicle key off event at the end of a drive cycle.

In one example for step 72, the overlap percentage is 60%. The vehicle 10 has a DPF with a restriction metric approaching the higher limit, such that the k value will be set to a small number, e.g. k=20%. As 60%>20%, an opportunistic aftertreatment procedure is enabled at that time. In another example, the overlap percentage is 60%, and the DPF restriction metric is low such that k=90%. As 60%<90%, the opportunistic DPF Regen is deferred to a later time.

Figure 3:
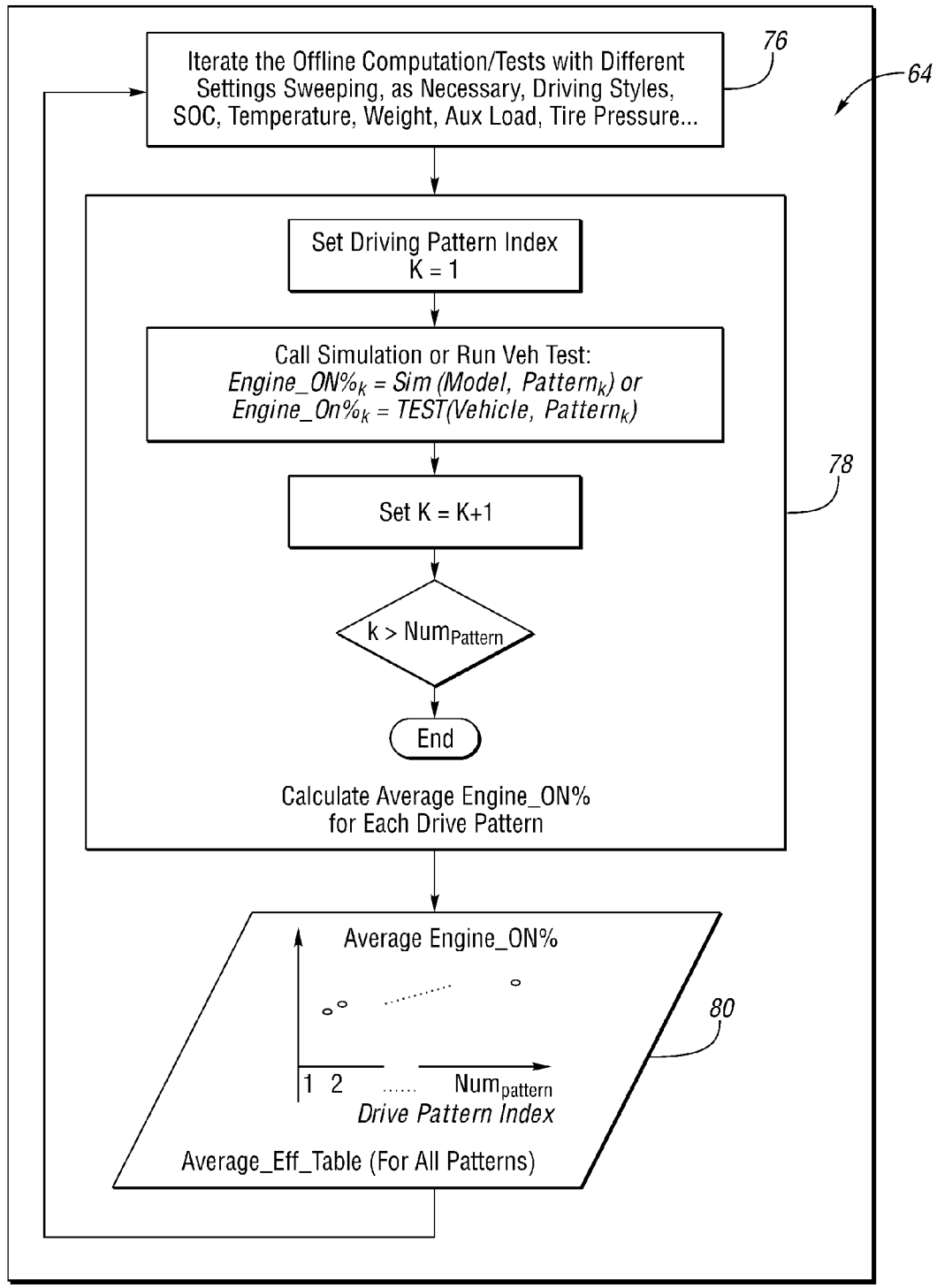
FIG. 3 is a flow chart illustrating a sub-step of FIG. 2 according to an embodiment.

FIG. 3 illustrates an example of an implementation of sub-step 64 for constructing calibration tables or lookup tables via model simulations or vehicle testing, for example, in an off-line situation to minimize real time computation in the vehicle 10. Step 64 calculates and stores the average EOT % for each driving pattern by performing a model simulation or running an actual real-world vehicle test. The average EOT % for a given driving pattern, $Pattern_k$, may be obtained either through a simulation, where EOT %=Sim(Model, $Pattern_k$), or through vehicle 10 testing, where EOT %=Test(Vehicle, $Pattern_k$). The simulations or vehicle tests may also consider additional factors such as SOC, various vehicle weights, tire pressure, etc. The tables 80 are created offline, however, it is also contemplated that the tables could be created or updated while the vehicle operates, or on-line.

As illustrated in FIG. 3, the simulations are iterated at 76 to sweep different driving styles, temperatures, weights, accessory loads, SOC, tire pressure, and other time-variant vehicle states. These parameters may then become additional inputs to the EOT % look-up tables. The simulations or tests are run at 78 by calculating an EOT % for each driving pattern. For example, average EOT % for driving $Pattern_k$ may be obtained through Engine_ON%k=Sim (Model, $Pattern_k$, SOC, Vehicle Weight, Driving Style, Accessory Load, . . . ), or Engine_ON%k=Test(Model, $Pattern_k$, SOC, Vehicle Weight, Driving Style, Accessory Load, . . . ). The results from the test or simulations at 78 provide multidimensional tables at 80 which correlate the driving pattern and the average EOT % for each pattern. As the number of inputs increases, the larger the tables 80 become as they have more dimensions to determine the driving pattern.

The number and type of inputs used may be chosen to result in a level of accuracy while retaining a manageable level of dimensionality in the table. The average EOT % is a value associated with a drive pattern, and different EOT % may exist for various drive patterns, such that the engine-on time percentage is tied to driving conditions. Step 64 performs iterations through each of the possible driving patterns to provide calibration or look up table at 80 to be used on-board the vehicle 10. The average EOT % numbers are needed to calculate the EOT.

Figure 4:
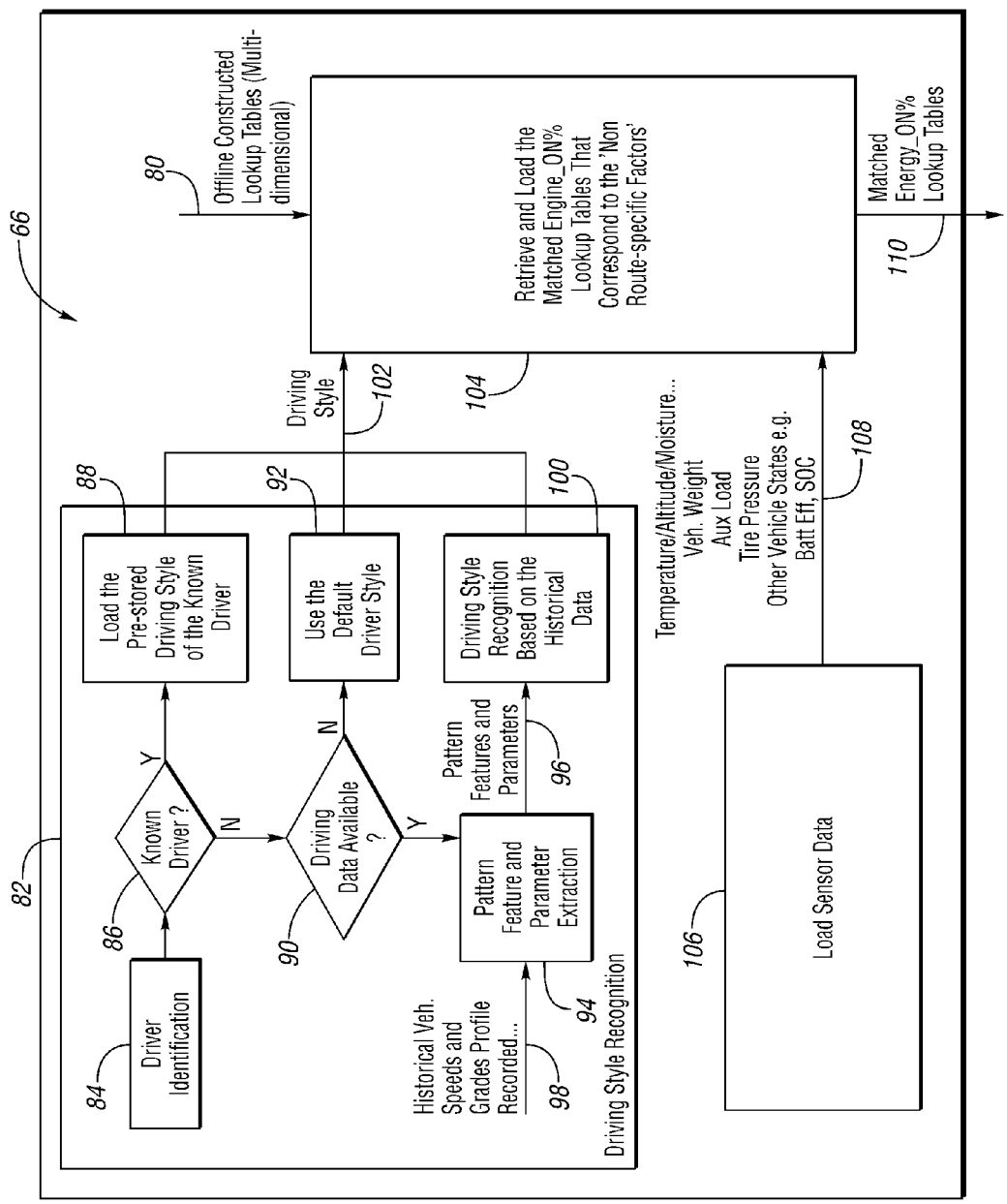
FIG. 4 is a flow chart illustrating a sub-step of FIG. 2 according to an embodiment.

FIG. 4 illustrates an example of an implementation of sub-step 66 for retrieving and loading the desired look up table 80. Various route-independent factors are loaded from sensor data. Driving style recognition occurs at 82 which uses a pattern recognition algorithm. A driving style may indicate different aggressiveness levels, e.g. calm, normal, and aggressive.

Driver identification begins at 84. The algorithm determines if this is a known driver at 86, and if it is, loads a stored driving style from a known driver profile at 88. If the driver is not known, the algorithm proceeds to 90 and determines if driving data is available for the unknown driver. If driver data is not available, the algorithm uses a default driver style at 92. If driving data is available at 90, the algorithm proceeds to 94 and extracts pattern features and parameters 96 from inputs 96 such as historical vehicle speeds, road grades, and the like. The pattern features and parameters 96 are used to recognize a driving style based on historical data for the vehicle at 100. The driver recognition module 82 provides a driving style 102 from one of 88, 92, and 100.

The driving style 102 is provided to module 104 that retrieves and loads the appropriate EOT % table corresponding to route independent factors from a database of multidimensional tables 80 provided through step 64. The tables 80 may be arranged in sets where each table set contains individual tables with individual driving patterns. The module 104 may receive inputs from various sources to use in determining which table set to use. The table may be indexed by the route independent factors. The module 104 also uses sensor data 106 for route independent information in determining which table to use. The sensor data 106 may include data 108 such as vehicle weight, tire pressure, SOC, and the like, which are measured using on-board vehicle sensors. The module 104 provides a matched EOT % table set 110.

Figure 5:
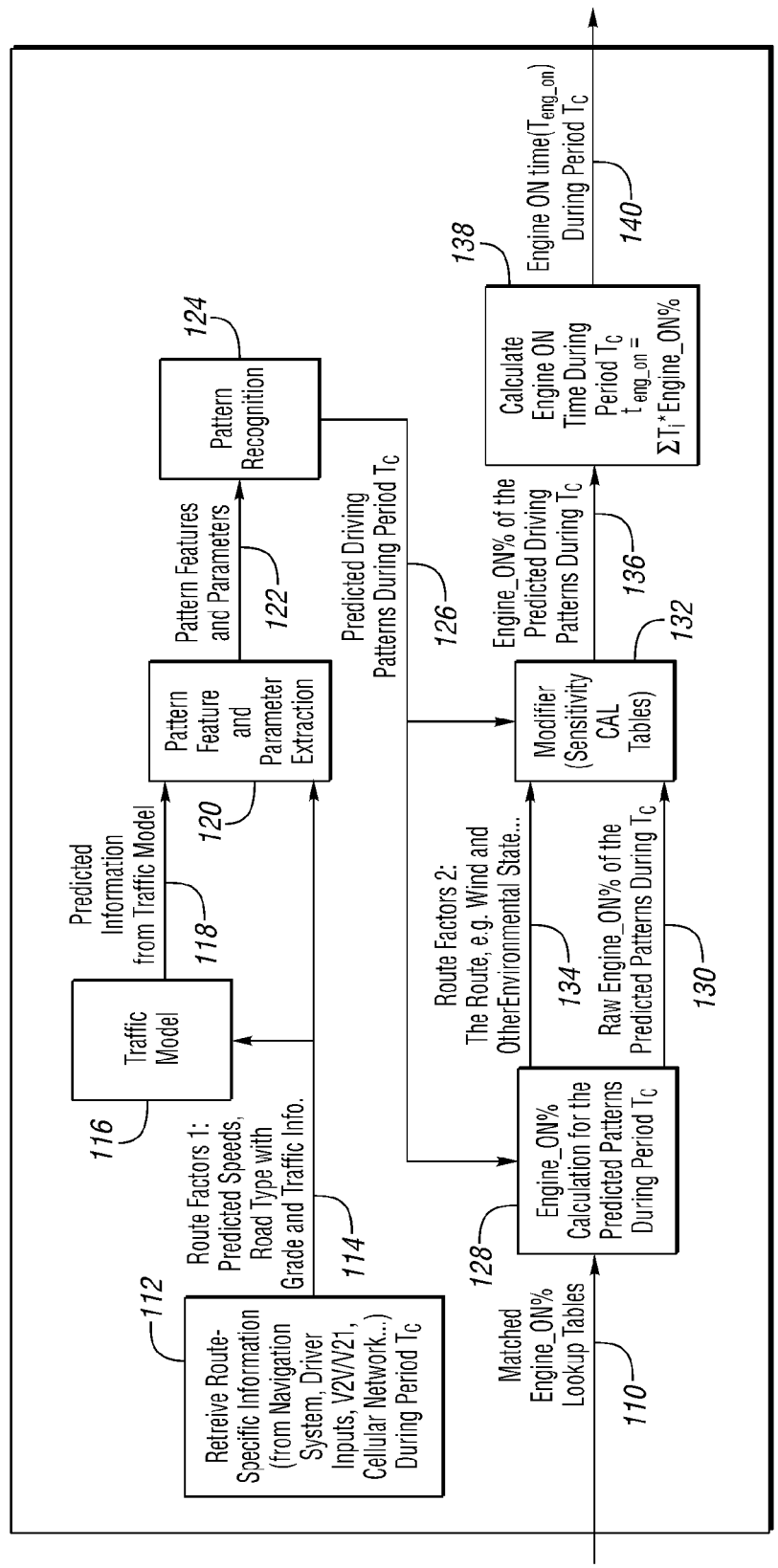
FIG. 5 is a flow chart illustrating a sub-step of FIG. 2 according to an embodiment.

FIG. 5 illustrates an example of an implementation of sub-step 68 or module for calculating an EOT % using pattern recognition to calculate EOT during a given period $T_c$. The module 68 begins by retrieving route specific information at 112. The route specific or route dependent information may be obtained from multiple sources including a navigation system, driver inputs, V2V/V2I (Vehicle to Vehicle/Vehicle to Infrastructure), cellular network, satellite network, or the like. The module uses the route dependent information from 112 to extract dominant factors 114.

The dominant factors 114 are used in a traffic model 116 which supplements with additional route related information. The traffic model provides predicted traffic considerations at 118 to a pattern feature and parameter extraction function at 120. The pattern feature and parameter extraction function 120 also receives a first set of route factors 114. The extraction function 120 collects and processes the information and extracts the pattern features and parameters 122. (App B)

The factors may be divided into a first and second set. The first set of factors may include information or states for the vehicle or the route itself, and may include driver command or power command from a road load, SOC, vehicle speed, and the like. The second set of factors may include random loads, such as an environmental state, weather conditions, wind, and other vehicle operations such as a heating, ventilation, and air conditioning (HVAC) system, and the like. Of course, other factors may be present, and the factors may be interchangeable between sets. The use of multiple sets of factors may reduce computational time for the vehicle 10.

The pattern parameter extraction function 120 represents a process to collect available pattern parameters, or to convert available information into typical driving pattern parameters. The function 120 extracts pattern parameters for predicting future driving patterns. Typical pattern parameters include: total distance of driving, average speed, maximum speed, standard deviation (SD) of acceleration, average acceleration, maximum acceleration, average deceleration, maximum deceleration, percentage of time within a specified speed interval, and percentage of time within a specified deceleration interval. Other parameters are also contemplated.

The parameters affect EOT % and may be used to differentiate between driving patterns, and may be observed, calculated or approximated from multiple information sources. For example, most pattern parameters for the 'current' driving condition are extracted from the most-recent speed profile recorded on-board by the control system 44, and processed into the desired format. Additionally with the availability of navigation systems, V2V/V2I (Vehicle to Vehicle/Vehicle to Infrastructure) and cellular and other networks, and traffic modeling, future information can be collected and processed into typical pattern parameters.

The pattern features and parameters 122 are used with a pattern recognition algorithm 124. The pattern recognition algorithm 124 recognizes one or more future driving patterns for the vehicle 10 from a set of standard driving patterns, and assigns a pre-defined driving pattern to each segment of a route or subroute, resulting in predicted driving patterns during the time period $T_c$, 126. A route or sub-route for the vehicle 10 may have one or more segments.

Step 128 uses the predicted driving patterns for time $T_c$ 126 and the matched EOT % tables 110 to provide a raw EOT % for the predicted patterns for time $T_c$ at 130. Step 128 looks up the corresponding average EOT % tables for the recognized driving patterns.

For example, if Pattern$_k$ is recognized as the current driving pattern at 124, the average EOT % 130 for Pattern$_k$ is found in the tables as EOT%_Average$_K$=Average_EOT%_Table(Pattern$_k$, SOC, Vehicle Weight . . . ). Similarly if future Patterns are recognized as Pattern$_t$, Pattern$_{t+i}$, . . . Pattern$_{t+Tend}$, step 124 may calculate a series of average EOT %s 130 for each predicted pattern as:

EOT%_Average$_t$=Average_EOT%_Table (Pattern$_t$, SOC, Vehicle Weight . . . );

EOT%_Average$_{t+1}$=Average_EOT%_Table (Pattern$_{t+1}$, SOC, Vehicle Weight . . . );

EOT%_Average$_{t+Tend}$=Average_EOT%_Table (Pattern$_{t+Tend}$, SOC, Vehicle Weight . . . ).

The various average EOT %s 130 act as an input to a modifier 132. The modifier 132 adjusts the raw average EOT % for each driving pattern by considering a second set of route-dependent factors 134. The second set of route dependent factors 134 include 'random loads' such as heating, ventilation, and air-conditioning (HVAC) use, stereo, other accessory use, weather, wind speed and direction, ambient temperatures, or other environmental states whose impacts may be relatively minor. The adjustments by the modifier 132 may be done through a set of scaling factors. The impact of the second set of factors 134 may be driving pattern dependent. The impact on overall EOT may be estimated from the impact of the second set of factors 134 on the average EOT % 130 for each of the driving patterns identified. The algorithm 132 may statistically estimate the factors 134 and modify the EOT % by using tables containing the relationships between the second set of factors 134 and EOT %. The scaling or weighting factors in modifier 132 are stored as calibrations and may be tuned to correspond with live vehicle testing and/or model simulations.

The modifier 132 provides an adjusted EOT % for the predicted driving patterns for time $T_c$, 136 into an algorithm 138 that calculates the total EOT during $T_c$ at 140 by taking the summation of the EOT for each driving pattern calculated by the EOT % for the driving pattern multiplied by the length of time for the driving pattern $T_i$. The total EOT at 140 is input to step 70 in FIG. 2.

The use of the method or algorithm in a vehicle may be detected in various ways. The occurrence of any aftertreatment procedures and the engine on and off status are easily accessible in a vehicle, such as through vehicle gauges, an on-board diagnostic interface, simple sensors, vehicle tests, etc. Input variables to the algorithm may include the route type, SOC, vehicle speed, vehicle weight, vehicle average EOT % in a driving pattern, etc. The output variable is the occurrence of the aftertreatment procedures. Use of the method in a vehicle may be detected through test procedures.

For example, a vehicle may be tested for a fixed driving pattern, and the various input variables may be measured and recorded. A drive profile favorable for a known aftertreatment procedure may be entered by the vehicle. If the aftertreatment procedure is triggered, the decision was based on the assumed future or predicted driving pattern. The test may be conducted for multiple driving patterns to increase the statistical certainty of the use of the algorithm. The occurrences of the aftertreatment procedures and the engine on and off status for each tested drive patterns may be correlated through a plot. When the algorithm is present in a vehicle, a number of the aftertreatment procedures will occur during qualified trip segments.

Various embodiments according to the present disclosure have associated advantages. For example, the algorithms disclosed use predictive information to intelligently optimize the aftertreatment occurrences in a diesel hybrid vehicle, and may significantly improve both fuel economy and emissions of the vehicle. The method establishes an engine-on time percentage for various driving patterns by using real-world driving conditions and driver styles from historical and predicted driving data to result in an engine-on time estimation. Use of models or simulations may reduce time and costs associated with live vehicle testing to the extent possible. Also use of simulation and testing to create tables offboard leads to reduced real-time computations by the vehicle controller when the vehicle is operated.

The methods and algorithms are independent of any particular programming language, operating system processor, or circuitry used to develop and/or implement the control logic illustrated. Likewise, depending upon the particular programming language and processing strategy, various functions may be performed in the sequence illustrated at substantially the same time or in a different sequence. The illustrated functions may be modified or in some cases omitted without departing from the spirit or scope of the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments that are not explicitly illustrated or described. Where one or more embodiments have been described as providing advantages or being preferred over other embodiments and/or over prior art with respect to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. As such, any embodiments described as being less desirable relative to other embodiments with respect to one or more characteristics are not outside the scope of the claimed subject matter.

What is claimed is:

1. A method to control a hybrid electric vehicle comprising:
in response to a compression ignition engine operating based on an engine-on request, performing an exhaust aftertreatment procedure if an overlap percentage is greater than a threshold value, the overlap percentage calculated as a ratio between a predicted engine-on time and a completion time for the procedure, the predicted engine-on time determined using at least one driving pattern during a completion time for the procedure.

2. The method of claim 1 wherein the engine-on time is determined using an associated engine-on time percentage for each driving pattern predicted for the completion time for the procedure and an estimated time for vehicle operation in each driving pattern during the completion time for the procedure.

3. The method of claim 2 further comprising using a database to reference each driving pattern and a corresponding engine-on time percentage, the database containing a plurality of possible driving patterns for an operating state of the vehicle.

4. The method of claim 2 further comprising adjusting the engine-on time percentage of each driving pattern predicted for the completion time using a scaling factor if a predetermined ambient condition exists.

5. The method of claim 1 further comprising detecting the driving pattern for the vehicle, wherein the driving pattern represents the predicted operation of the vehicle during the completion time.

6. The method of claim 5 further comprising assigning the driving pattern to a predicted path for the vehicle during the completion time.

7. The method of claim 6 wherein the predicted path and the driving pattern are based on future route information.

8. The method of claim 7 further comprising providing the future route information from a navigation system.

9. The method of claim 7 further comprising providing the future route information from a traffic system.

10. The method of claim 5 wherein detecting the driving pattern includes determining a driving style for the vehicle.

11. The method of claim 10 wherein the driving style is based on historical vehicle usage.

12. The method of claim 1 further comprising determining the driving pattern using a driving pattern identification method and a predicted trip condition.

13. A vehicle comprising:
a compression ignition engine having an exhaust aftertreatment system;
an electric machine coupled to a traction battery; and
a controller electronically coupled to the engine wherein the controller is configured to: (i) operate the engine based on an engine-on request, and (ii) perform an exhaust aftertreatment procedure for the vehicle based on a completion time for the aftertreatment procedure compared to a predicted engine-on time determined using a driving pattern;

wherein the engine is coupled to the electric machine using an upstream clutch, and the electric machine is coupled to a transmission using a downstream clutch; and wherein the engine, the electric machine, and the transmission are arranged sequentially.

14. The vehicle of claim 13 wherein the controller is configured to use a database to reference the driving pattern and a corresponding engine-on time percentage, the database containing a plurality of possible driving patterns for an operating state of the vehicle, wherein the controller determines the engine-on time using the associated engine-on time percentage for the driving pattern.

15. The vehicle of claim 13 wherein the controller is configured to determine the driving pattern using a driving pattern identification method and a predicted trip condition.

16. The method of claim 1 wherein the threshold value varies as a function of a state of an exhaust aftertreatment device, such that an increasing need for exhaust aftertreatment decreases the threshold value.

17. The method of claim 1 further comprising estimating a completion time for the aftertreatment procedure if beginning the procedure at a present time; and
assigning an estimated time and a driving pattern from a series of driving patterns to each segment of a route during the completion time, each driving pattern having an associated engine-on time percentage, each segment having an associated segment engine-on time calculated using the engine-on time percentage and the estimated time;

wherein the engine-on time is determined as a total engine-on time for the vehicle during the completion time using a summation of the segment engine-on times.

18. The method of claim 1 wherein the engine-on request is based on one of a driving command, a battery state of charge, and a vehicle cabin climate control request.

19. A hybrid vehicle comprising:
a compression ignition engine having an exhaust aftertreatment system; and
a controller configured to calculate a ratio between a predicted engine-on time (EOT) and a completion time for an exhaust aftertreatment procedure when the engine is operating, and command the procedure if the ratio is greater than a threshold value, the EOT calculated using an engine-on time percentage and an estimated segment time for each driving pattern predicted during the completion time.

20. The vehicle of claim 19 wherein the controller is further configured to determine the threshold value as a function of a state of the exhaust aftertreatment system.

* * * * *